United States Patent [19]

Krude et al.

[11] 4,249,395
[45] Feb. 10, 1981

[54] HOMOKINETIC UNIVERSAL JOINT ASSEMBLY

[75] Inventors: Werner Krude, Neunkirchen; Peter Harz, Hennef, both of Fed. Rep. of Germany

[73] Assignee: Uni-Cardan Aktiengesellschaft, Lohmar, Fed. Rep. of Germany

[21] Appl. No.: 935,875

[22] Filed: Aug. 23, 1978

[30] Foreign Application Priority Data

Sep. 21, 1977 [DE] Fed. Rep. of Germany ....... 2742384

[51] Int. Cl.³ .............................................. F16D 3/30
[52] U.S. Cl. ............................................. 64/21; 64/8
[58] Field of Search ................................... 64/21, 7, 8

[56] References Cited

U.S. PATENT DOCUMENTS

| | | | |
|---|---|---|---|
| 1,847,677 | 3/1932 | Sternbergh | 64/21 |
| 1,868,540 | 7/1932 | Myers | 64/21 |
| 1,947,046 | 2/1934 | Hoffman | 64/21 |
| 2,286,498 | 6/1942 | Miller, Jr. | 64/21 |
| 2,313,279 | 3/1943 | Suczek | 64/21 |
| 2,462,700 | 2/1949 | Wingquist | 64/21 |
| 2,532,433 | 12/1950 | Wingquist | 64/21 |

*Primary Examiner*—Tony M. Argenbright
*Assistant Examiner*—Magdalen Moy
*Attorney, Agent, or Firm*—Toren, McGeady and Stanger

[57] ABSTRACT

A homokinetic universal joint assembly including an outer and an inner joint member with roller bodies engaged for torque transmission therebetween includes a guide member which is located centrally of the assembly within the inner joint member and which supports the roller bodies in the bisecting plane of the assembly. A control sleeve defines a mounting groove extending through the joint center and the guide member is supported within the mounting groove for movement in a direction radially of the joint assembly. The control sleeve is provided with spherical surfaces located equivalent distances on opposite sides of the joint center which are engaged to guide the control sleeve within the inner and outer joint members.

7 Claims, 5 Drawing Figures

HOMOKINETIC UNIVERSAL JOINT ASSEMBLY

BACKGROUND OF THE INVENTION

The present invention relates generally to the structure of a homokinetic universal joint and more particularly to a joint wherein an inner joint member and an outer joint member are engaged for torque transmission therebetween by roller bodies which comprise essentially spherical balls. The roller bodies are engaged within grooves formed on the inner wall of the outer joint member and recesses formed on the inner joint member, with a corresponding number of grooves and recesses being provided.

Furthermore, the invention relates to an assembly wherein there is provided at the center of the joint a guide member supported in the inner joint member for mounting the roller bodies in the bisecting plane of the assembly.

Joint assemblies known in the prior art, for example U.S. Pat. No. 1,847,677, have been found to be uneconomical to manufacture and rather expensive to produce because of cumbersome design characteristics. In such prior art devices, the outer member consists of two parts and a separation must be provided inasmuch as the spherical inner joint member must be enclosed. However, since grooves for retaining the torque transmitting balls extend concentrically to the center of the joint, the separation which must be provided extends through the grooves for the balls. This results in the requirement that the ball grooves of both parts of the joint must be manufactured with very exacting standards in order to ensure a precise shape for the grooves. Moreover, because of the fact that the inner joint member is guided in a hollow space of the outer guide member, a joint of this type will involve large friction surfaces. Additionally, it can only be constructed as a fixed joint. The use of the guide element of such a joint is also uneconomical. For this purpose, the inner joint member must have continuous grooves into which the individual guide elements are placed in order to be subsequently centered by means of a spring element. The grooves receiving the guide elements in the joint member have a very complicated shape and therefore they must be manufactured under very difficult conditions.

Moreover, joints are known, for example from U.S. Pat. No. 2,462,700, which do consist of two joint halves and which are provided with a central control lever. However, guidance of the roller bodies in the bisecting plane of the joint is very difficult and can only be effected by means of additional guide members. Also, in this joint, the first joint member is encircled by the second joint member so that, again, only a fixed joint can be provided. Moreover, in the design of the joint members, only roller bodies which are capable of being supported by pins may be used.

In view of the foregoing, the present invention is directed toward provision of a homokinetic universal joint having a design which is relatively simple and wherein a control member may be provided having long, symmetrical staggered portions for reducing friction losses in a manner whereby the structural length of the joint does not become larger.

SUMMARY OF THE INVENTION

Briefly, the present invention may be defined as a homokinetic universal joint assembly having a joint center and defining a bisecting plane comprising an outer joint member, an inner joint member and roller bodies engaged between said inner and outer joint members for transmitting torque. A guide member is located centrally of the joint assembly within the inner joint member supporting the roller bodies in the bisecting plane and a control sleeve defines a mounting groove extending through said joint center, with the guide member being supported within the mounting groove for movement in a direction radially of the assembly. The control sleeve is formed with generally spherical surfaces located on opposite sides of the joint center and spaced apart a generally equivalent distance, said spherical surfaces being engaged to guide the control sleeve within the inner and outer joint members. The arrangement of the present invention is advantageously adapted for construction either as a fixed joint or a sliding joint, and it may be produced by using relatively simple parts. The control sleeve is provided with spherical guide surfaces which are arranged a corresponding distance from the center of the joint so that low friction characteristics will result due to the long moment arms and small radii of the guide surfaces. It is a further advantage that the inner joint member is not guided by its outer surface in the hollow interior space of the outer joint member and this feature also contributes to maintaining the friction losses relatively low.

In order to simplify the structure of the joint, the outer joint member is formed with a cylindrical configuration and the base of the grooves is provided with a circular shape having a radius whose center is identical with the center of the joint.

The invention advantageously enables the joint to be constructed as a sliding joint when the recesses of the inner joint member which receive therein the torque transmitting balls are formed with an appropriate length.

In accordance with another feature of the invention, the joint may be constructed as a fixed joint whereupon the control sleeve is fixed in the outer joint member and in a tubular or shaft portion of the inner joint member. The fixing of the control sleeve in the inner and outer joint members is effected by spherical guide surfaces formed within the joint assembly to interact with the spherical surfaces of the control sleeve. In this manner a sliding motion in the joint may be eliminated and a fixed joint may be obtained without requiring additional components.

In accordance with another feature of the invention, when the assembly is constructed as a fixed joint, the interior surface of the outer joint member may be structured to form a spherical guide surface for the outer spherical surface of the inner joint member. As a result of this structure, and due to the fact that the inner joint member is engaged by the outer joint member, the two members will be unable to move relative to each other.

In order to achieve relative movement between the outer joint member and the inner joint member, the assembly according to another embodiment of the invention may be constructed as a sliding joint with the control sleeve being axially fixed in the outer joint member and slidably supported in the bore of the shaft integrally formed with the inner joint member. The recesses will have a cross section which corresponds in the circumferential direction with the diameter of the torque transmitting balls with the length of the recesses taken in the axial direction being larger than the ball diameter to provide an increased sliding path for the balls.

In an embodiment constructed in the foregoing manner, movement of the inner joint member relative to the outer joint member is enabled by virtue of the fact that the recesses are formed with a sufficient length extending in the axial direction of the joint to permit such movement. The control sleeve is guided in the inner bore of the inner joint member and, thus, it may also partake in the relative movement. In this embodiment, it is possible to provide a sliding joint from a fixed joint in a simple manner without requiring additional components.

In order to obtain a joint which is simple in manufacture and which is inexpensive, the control sleeve is structured to consist of two essentially identical sheet metal parts which are formed by a deep drawing technique. The parts are securely but detachably connected to each other by means of a screw connection. Furthermore, the guide member supporting the roller bodies may also consist of two sheet metal parts which are joined together at the center axis of the joint and which may form a circumferentially extending guide groove within which the roller bodies are received.

Since the inner joint member is formed with a hollow interior space, the guide member supporting the roller balls or bodies may be formed with a circular guide groove within which the balls are supported. This enables provision of a guide element which may be easily assembled and produced from only two sheet metal discs which are thus joined to form the guide groove on the circumference of the guide member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
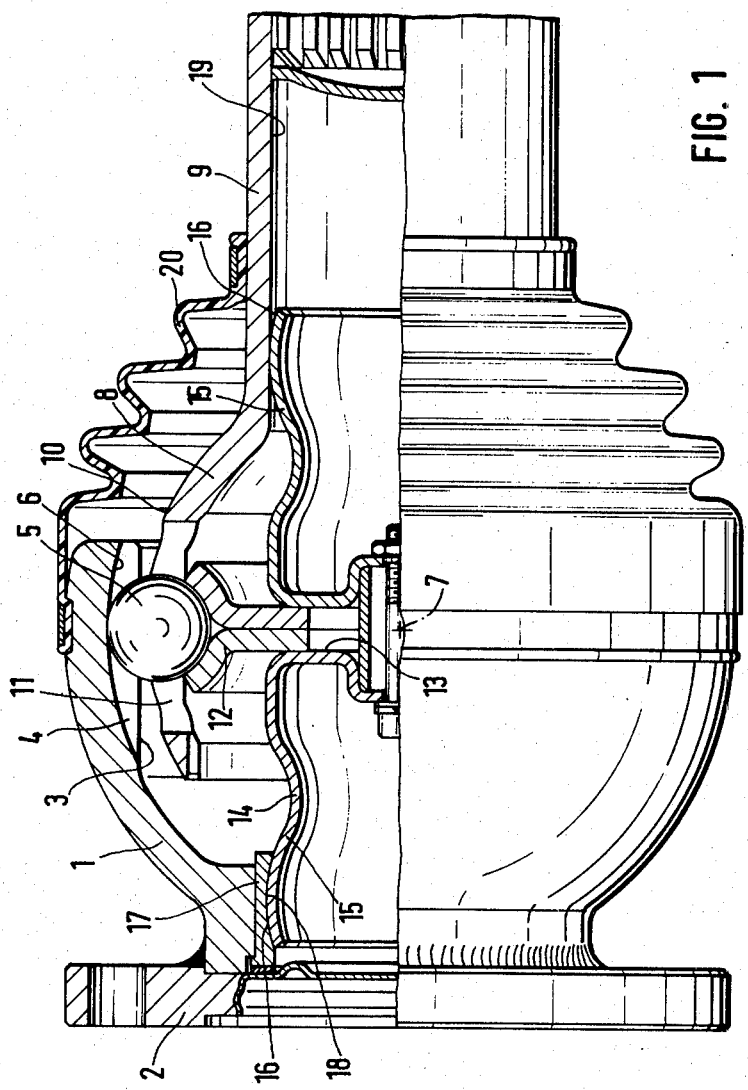
FIG. 1 is a sectional view of a sliding joint in accordance with the invention wherein the outer joint member has a cylindrical hollow interior space and wherein the guide sleeve is guided only in the outer joint member.

Referring now to the drawings wherein like reference numerals are used to refer to similar parts throughout the various figures thereof, a homokinetic universal joint assembly in accordance with the present invention is shown in FIG. 1 as essentially comprising an outer joint member 1 having a closed end which is provided with, for example, a flange 2 for fastening of a driving or a driven member. In a cylindrical hollow interior surface 3 of the outer joint member 1 there are arranged grooves 4 which are uniformly distributed over the circumference of the member and which are adapted to receive in torque transmitting engagement roller bodies such as spherical balls 5 which operate to transmit torque.

The grooves 4 have a groove base 6 formed with a circular configuration which has a generating radius whose center is coincident with a center 7 of the joint assembly. The outer joint member 1 receives within its inner space an inner joint member 8 which is, however, arranged at a distance from the inner cylindrical surface 3 of the outer joint member 1.

The inner joint member 8 is integrally formed with a tubular shaft portion 9 and is provided with an outer spherical surface 10 and with axially extending recesses 11 which are distributed over the circumference of the inner member 8 and which serve to receive therein the balls 5 for transmission of torque from the inner joint member 8 to the outer joint member 1.

The width of the recesses in the inner joint member taken in a direction circumferentially of the joint assembly corresponds to the diameter of the balls 5. However, the length of the recesses taken in the axial direction is formed larger than the diameter of the balls by an increased length sufficient to permit sliding movement of the balls in the axial direction relative to the inner joint member.

A guide member 12 located within the inner joint member 8 and formed of two sheet metal parts defines a groove extending circumferentially of the joint within which the balls 5 are received and supported. It will be noted that the circumferential groove defined by the guide member 12 within which the balls 5 are received extends transversely and essentially perpendicularly to the grooves 4 of the outer joint member 1. The inner portion of the guide member 12 is received within a groove 13 of a control sleeve 14 within which the guide member 12 is supported for movement in the radial direction of the joint. The center of the groove 13 and the center of the guide element 12 lie in a plane which extends through the center 7 of the joint assembly.

The control sleeve 14 consists of two halves which extend approximately symmetrically with ends 15 located, respectively, on opposite sides of the grooves 13 being formed to define spherical outer surfaces 16.

If a joint assembly is to be formed, for example, to permit relative movement between the outer joint member 1 and the inner joint member 8, as is the joint assembly shown in FIG. 1, then the control sleeve 14 with its end 15 facing toward the outer joint member is axially fixedly connected at its spherical outer surface 16 in a fastening element 17. For this purpose, the fastening element 17 is provided with a spherical inner surface 18 for receiving the surface 16 of the sleeve 14, with the spherical inner surface 18 corresponding to the outer spherical surface 16 of the control sleeve 14. The end 15 of the control sleeve 14 located opposite the outer joint member 1 is axially movably received in a bore 19 of the tubular shaft portion 9. During the relative movement between the inner joint member 8 and the outer member 1 this engagement serves to guide the guide member 12. The bore 19 of the tubular shaft portion 9 corresponds in diameter to the spherical outer surface 16 of the control sleeve 14. The two halves of the control sleeve 14 are fixed to each other at a central portion thereof by means of a screw connection in a manner whereby the two halves can be detached. A sealing boot 20 serves to seal the interior of the joint from contamination.

Figure 2:
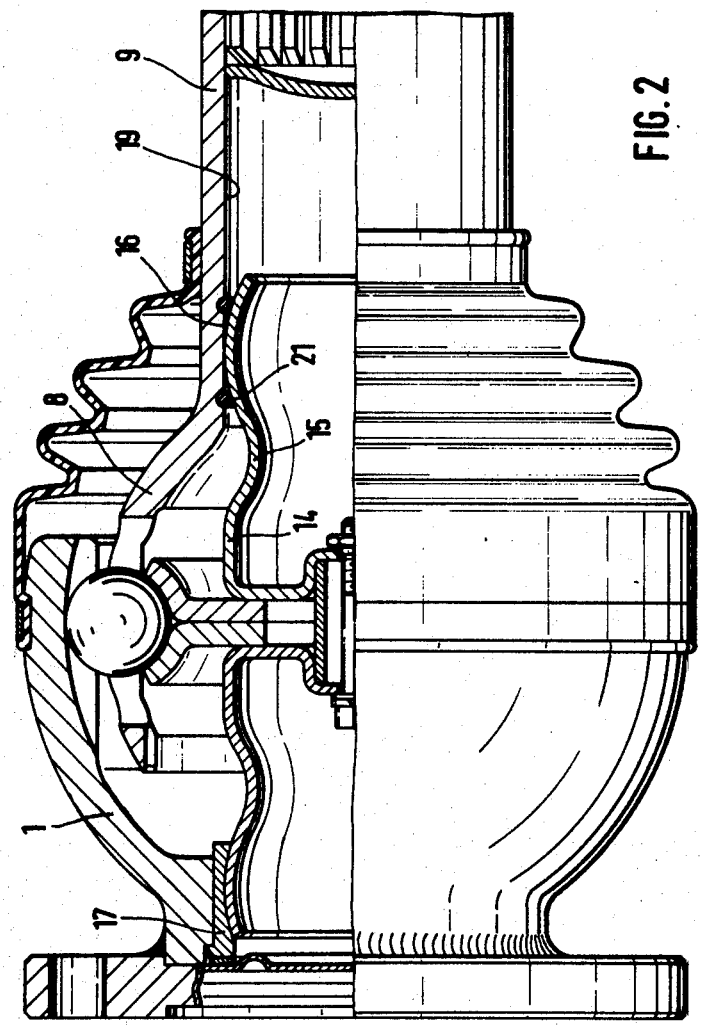
FIG. 2 is a sectional view showing a fixed homokinetic universal joint which differs from the arrangement shown in FIG. 1 in that the control sleeve is fixed in the outer joint member as well as in the inner joint member by means of a locking ring.

FIG. 2 depicts a joint which basically corresponds to the joint shown in FIG. 1 but which is, instead, a fixed joint wherein the inner joint member 8 cannot perform movements relative to the outer joint member 1. The relative movement of the two joint members is prevented because the end 15 of the control sleeve 14 facing away from the outer joint member 1 is fixed at its spherical outer surface 16 by locking rings 21 which are received in grooves formed in the bore 19 of the tubular shaft portion 9. The locking rings 21 and the fastening element 17 of the outer joint member 1, which has a spherical contour on its interior, ensure that the joint members are unable to perform relative movements unless other changes in the joint assembly are made.

Figure 3:
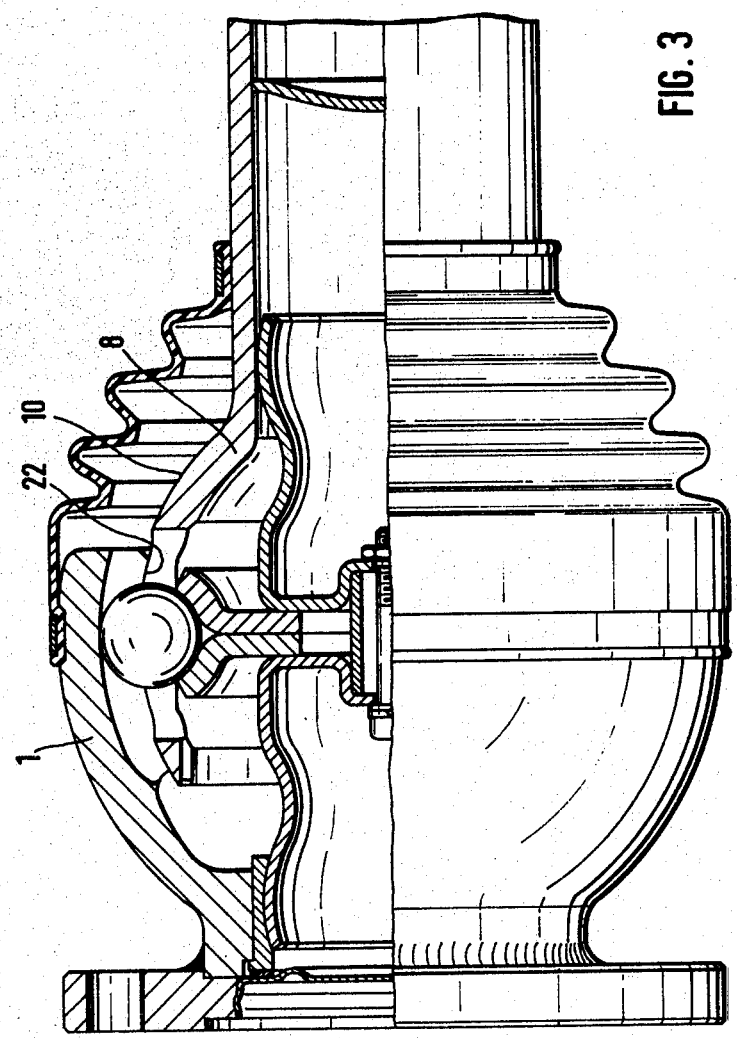
FIG. 3 is a sectional view of a fixed homokinetic universal joint wherein the inner joint member is guided with its outer spherical surface in the spherical hollow space of the outer joint member.

In FIG. 3 there is shown a joint which is constructed as a fixed joint and which has elements which are basically arranged in a manner similar to the joint shown in FIG. 1. However, differences reside in the fact that the outer joint member 1 is provided with a spherical inner surface 22. This spherical inner surface 22 corresponds in diameter to the spherical outer surface 10 of the inner joint member 8. As a result, the inner joint member 8 is guided by the inner surface 22 of the outer joint member 1 and, thus, the joint is axially fixedly arranged.

Figure 4:
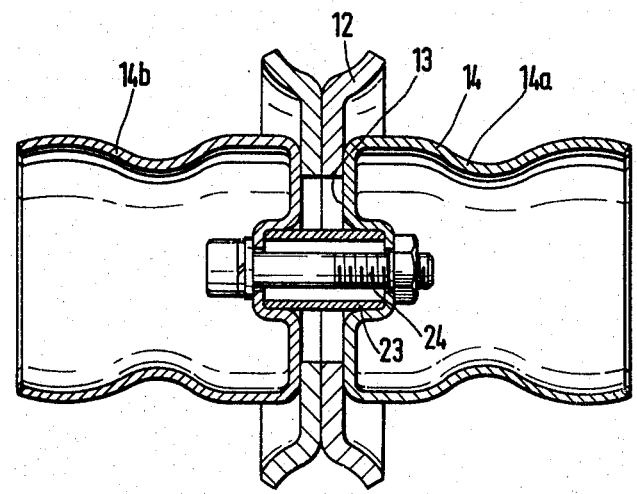
FIG. 4 is a sectional view showing on an enlarged scale the control sleeve of the invention with the guide member arranged thereon, the control sleeve consisting of a pair of individual parts which are connected together by screw means.

FIG. 4 shows a control sleeve 14 having grooves 13 which receive the guide member 12. The control sleeve 14 consists of two halves 14a and 14b. In the center of the control sleeve 14, the two halves are held at a desired distance from each other by means of a spacer sleeve 23 and they are detachably secured together by means of a fastening screw 24.

Figure 5:
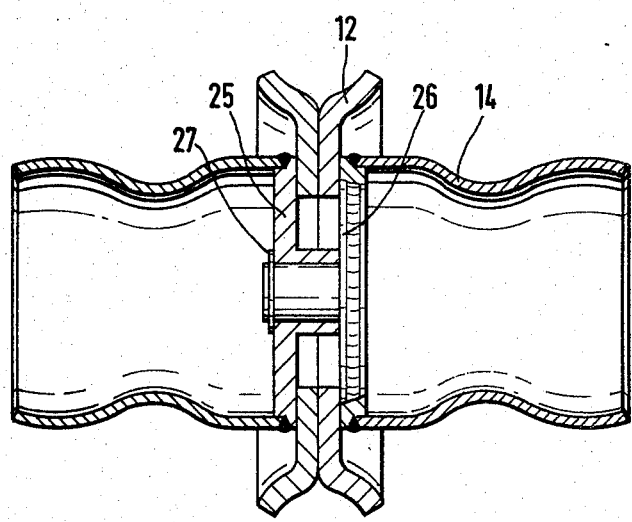
FIG. 5 is a sectional view showing a control sleeve with a guide member similar to that shown in FIG. 4 except that the two parts of the control sleeve are welded together.

By contrast with the arrangement shown in FIG. 4, there is illustrated in FIG. 5 a control sleeve which is welded to a spacer 25 at its center, with a pin of a distance washer 26 engaging the central bore of the spacer 25, the distance washer 26 being welded to the second part of the control sleeve 14. Fastening is effected by means of a locking ring 27 which engages a groove of the pin of the washer 26.

It should be understood that when determining the width of the groove 13, it must always be formed to ensure that the guide member 12 is radially movably received therein. This movable arrangement of the guide member 12 within the groove of the control sleeve is necessary for the functioning of the joint.

While specific embodiments of the invention have been shown and described in detail to illustrate the application of the inventive principles, it will be understood that the invention may be embodied otherwise without departing from such principles.

What is claimed is:

1. A homokinetic universal joint assembly having a joint center and defining a bisecting plane comprising: an outer joint member; an inner joint member; said outer joint member and said inner joint member being arranged for axial mobility relative to each other to form said joint assembly as a sliding joint; roller bodies having a generally spherical configuration engaged between said inner and outer joint members for transmitting torque therebetween; a guide member located centrally of said joint assembly within said inner joint member supporting said roller bodies in said bisecting plane; a control sleeve defining a mounting groove extending through said joint center with said guide member being supported within said mounting groove for movement in a direction radially of said joint assembly; means on said control sleeve defining spherical surfaces located on opposite sides of said joint center and spaced a generally equivalent distance therefrom, said spherical surfaces being engaged to guide said control sleeve within said inner and outer joint members; and means defining recesses in said inner joint member for receiving therein in torque transmitting engagement said roller bodies, said recesses having a width taken in the circumferential direction of said joint generally corresponding to the diameter of said roller bodies and a length taken in the axial direction of said joint which is greater than the diameter of said roller bodies by an amount to permit sliding movement of said roller bodies relative to said inner joint member.

2. A joint assembly according to claim 1 wherein said outer joint member is formed with an interior surface having a cylindrical configuration and wherein grooves are formed on said interior surface of said outer joint member to receive said roller bodies, said grooves having a groove base with a circular configuration formed with a radius having a center which is coincident with said joint center.

3. A joint assembly according to claim 1 wherein said control sleeve is formed of two essentially identical sheet metal bodies, said assembly including screw means detachably connecting said sheet metal bodies together.

4. A joint assembly according to claims 1 or 3 wherein said guide members consists of two sheet metal parts which are joined together at the center of said joint and which define said mounting groove therebetween.

5. A joint assembly according to claim 1 wherein said mounting groove defined in said control sleeve for receiving said roller bodies has a circular configuration extending circumferentially of said guide member.

6. A joint assembly according to claim 1 wherein said guide member is formed of a pair of disc-shaped sheet metal parts which are joined together along said joint center and which are configured to define said mounting groove as a guide groove which extends circumferentially about said guide member.

7. A joint assembly according to claim 1 wherein said inner joint member is formed with a hollow shaft portion extending outwardly of said joint assembly, and wherein said control sleeve is axially fixed in said outer joint member and movably supported within said hollow shaft portion.

* * * * *